J. T. WANN.
EVAPORATOR.
APPLICATION FILED SEPT. 24, 1912.
1,089,027.
Patented Mar. 3, 1914.
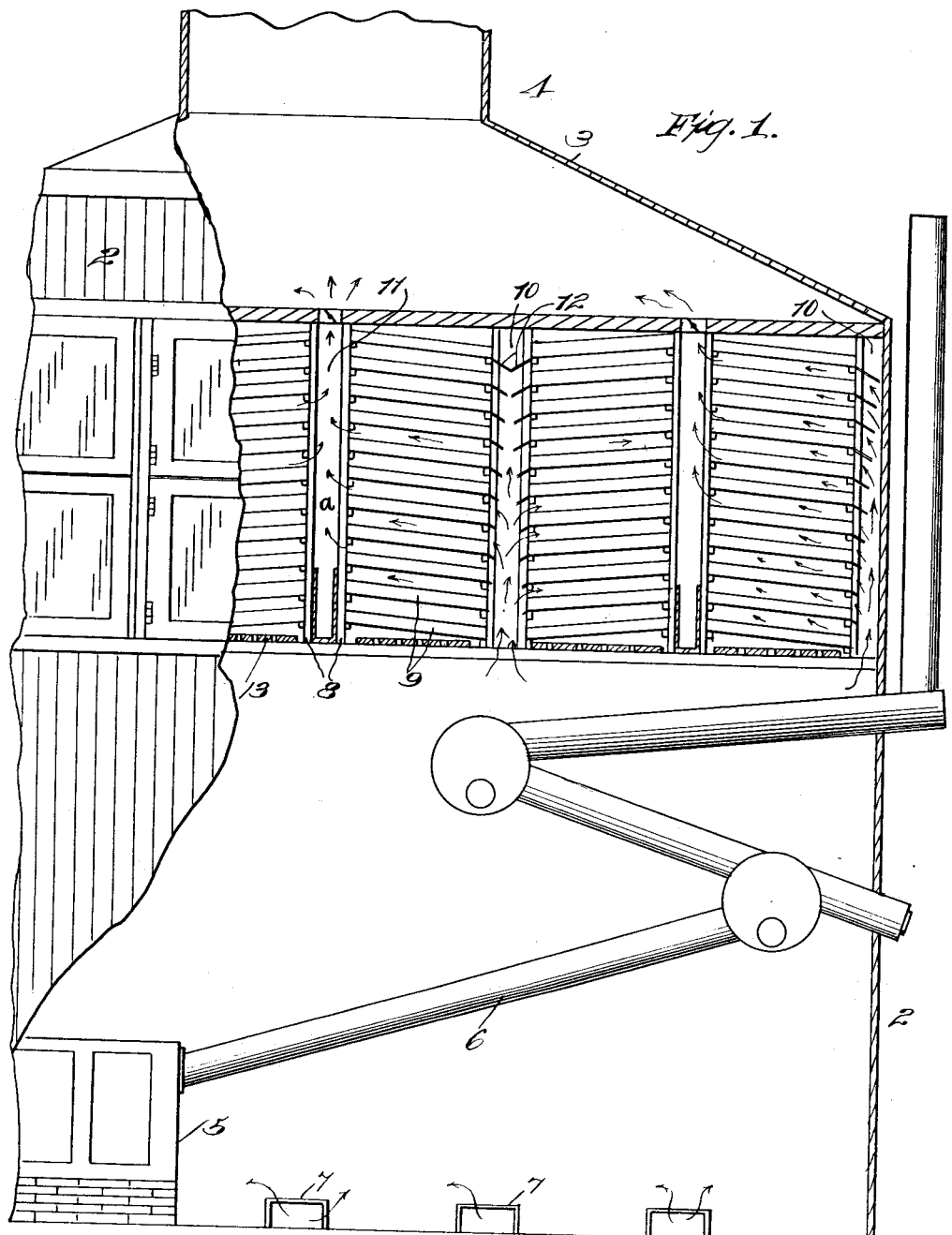
Fig. 1.
Fig. 2.
WITNESSES:
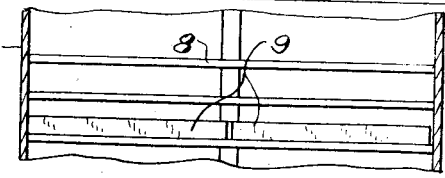
INVENTOR
John T. Wann,
BY G. H. Strong.
ATTORNEY

UNITED STATES PATENT OFFICE.

JOHN T. WANN, OF BERKELEY, CALIFORNIA.

EVAPORATOR.

1,089,027.  Specification of Letters Patent.  Patented Mar. 3, 1914.

Application filed September 24, 1912. Serial No. 722,073.

*To all whom it may concern:*

Be it known that I, JOHN T. WANN, a citizen of the United States, residing at Berkeley, in the county of Alameda and State of California, have invented new and useful Improvements in Evaporators, of which the following is a specification.

This invention relates to apparatus for curing or evaporating fruit or vegetables.

The object of the present invention is to provide an apparatus, in which large quantities of fruit or vegetables can be thoroughly cured or evaporated, and particularly to provide an evaporating apparatus, in which the parts are so arranged that each will receive a desired volume of warm air which has not previously been used for evaporating purposes during its passage through the apparatus.

It is also an object of the invention to provide novel means for directing portions of an upwardly ascending current of warm air to and through fruit or other trays which are insertible and removable from one side of the kiln to the other.

The invention consists of the parts and the construction and combination of parts as hereinafter more fully described and claimed, having reference to the accompanying drawings, in which—

Figure 1 is a vertical, longitudinal section through the apparatus. Fig. 2 is a vertical, transverse section through a portion of the kiln.

In its illustrated embodiment, I have shown an appropriate housing 2 with a hood or covering 3 and a vent 4 thereon. There is provided in the lower part of the housing a suitable type of furnace 5, from which extend tortuous or zigzag heat flues or tubes 6. The function of the tubes 6 is to heat an incoming volume of air admitted through inlet passages 7, adjacent to the floor of the structure.

At a suitable height within the housing is erected a series of vertical racks 8 forming, substantially, a kiln; the racks being adapted to receive and support in an inclined position, preferably, fruit or vegetable-holding trays 9, which may be inserted at one side of the housing 2 and removed from the racks at the opposite side. The racks are long enough, preferably, to hold a plurality of the trays 9. The tray-supporting racks 8 are arranged with their vertical standards spaced apart to form inlet or up-draft chambers 10, between the lower adjacent ends of the inclined trays 9, and also to form escape flues or chambers 11 between the adjacent higher ends of the trays 9. The lower portions of the up-flues or chambers 10 open directly into the interior or heat room of the housing 2, so that the heated air will rise through the chambers 10, from which it will be deflected in graduated or even quantities to spread in opposite directions and pass under and upwardly through the superposed trays 9 in the kiln.

In order to insure the proper distribution of the air through the trays, so that each volume of fruit thereon will be subjected to the action of an unused quantity of heated air, I provide and arrange inclined, transversely extending deflectors or flanges 12, attached to the racks 8, so that as the heated air rises it encounters and is deflected laterally by the overhanging deflectors 12. The deflectors 12 are shown as gradually increasing in width toward the upper part of the kiln; the uppermost of the deflectors substantially meeting in the upper portion of the chamber 10. This insures the even distribution of the upwardly rising current of air over, under and through each of the trays 9. By the inclined arrangement of the trays 9, in conjunction with the deflectors 12, a quantity of the heated air is utilized but once in passing through a given tray where its effect is exerted upon the fruit or vegetables, and, after passing through the same, the now moisture-laden air escapes into the discharge chamber 11, between the adjacent upper ends of the trays 9, as indicated by the arrows *a*.

The advantage of the present construction is that a given quantity of heated air is caused but once to traverse a relatively small quantity of fruit on a single tray, when it is then free to discharge into the escape chamber 11; this preventing the uppermost trays in a vertical tier from being subjected to moisture-laden air previously utilized. The consequence is that by my apparatus I am enabled to cure commercially successfully large volumes of material in a comparatively small space of time.

For the purpose of preventing the lowermost trays 9 from being subjected to too great a heat, I provide removable, perforated or other suitable deflectors 13 for the protection of the fruit.

Having thus described my invention, what

I claim and desire to secure by Letters Patent is—

An evaporating apparatus comprising an air heating chamber common to a plurality of racks, a series of racks arranged over said chamber, removable fruit carrying trays arranged in said racks, heated air inlet flues, exit flues for said heated air, a chamber over said exit flues and forming a common outlet for all of said exit flues, said inlet and said exit flues being arranged in alternation to provide an inlet flue on one side and an exit flue on the other side of each of said racks, said fruit trays being inclined upwardly away from each inlet flue and toward each exit flue, and deflectors on each side of the inlet flues to direct the heated air current over the trays toward the exit flues.

In testimony whereof I have hereunto set my hand in the presence of two subscribing witnesses.

JOHN T. WANN.

Witnesses:
 JOHN H. HERRING,
 W. W. HEALEY.